US008834164B2

(12) United States Patent
Grant et al.

(10) Patent No.: US 8,834,164 B2
(45) Date of Patent: *Sep. 16, 2014

(54) OBSERVER TRAINER SYSTEM (71) Applicant: Her Majesty The Queen in Right of Canada, as Represented by the Minister of National Defence, Ottawa (CA)

(72) Inventors: Stuart Grant, Ottawa (CA); Tony Ghoman, Mississauga (CA)

(73) Assignee: Her Majesty The Queen in Right of Canada, as represented by the Minister of National Defence, Ottawa, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/652,945

(22) Filed: Oct. 16, 2012

(65) Prior Publication Data
US 2013/0115576 A1    May 9, 2013

Related U.S. Application Data

(63) Continuation-in-part of application No. 12/292,729, filed on Nov. 25, 2008, now Pat. No. 8,360,777.

(51) Int. Cl.
*G09B 9/02*    (2006.01)
*G09B 19/16*   (2006.01)
*G09B 9/16*    (2006.01)
*G09B 9/00*    (2006.01)
*G09B 9/30*    (2006.01)

(52) U.S. Cl.
CPC .. *G09B 9/16* (2013.01); *G09B 9/00* (2013.01); *G09B 9/006* (2013.01); *G09B 9/30* (2013.01)
USPC ............................................. 434/38; 434/29

(58) Field of Classification Search
CPC ................................. G09B 9/16; G09B 9/006
USPC ......... 434/29, 30, 43, 44, 46, 62, 9, 219, 372, 434/34, 35, 38, 41, 42, 69
See application file for complete search history.

(56) References Cited

U.S. PATENT DOCUMENTS 3,205,303 A    9/1965   Bradley
3,371,432 A *  3/1968   Lamb ............................. 434/43

(Continued)

OTHER PUBLICATIONS

J. Clantanoff, "Advanced Program Briefing to Industry", Aircrew Operations & Training, Headquarters Air Mobility Command, Enabling the "Global" in "Global Vigilance, Reach and Power!" symposium.
Bohemia Interactive, "AVRS—Air Crewman Virtual Reality Simulation", online: <http://www.vbs2.com/avrs/>, accessed Nov. 2008.

(Continued)

*Primary Examiner* — Robert J Utama
*Assistant Examiner* — Sadaruz Zaman
(74) *Attorney, Agent, or Firm* — Brion Raffoul (57) ABSTRACT

Systems and methods for use in training crewmembers in the cargo compartment in detecting and identifying visual cues related to potential threats to aircraft and to ground based search and rescue circumstances. A visual display displays a scene generated by a visual scene generator apparatus. A vision limiting device, such as an actual door from an aircraft, equipped with a window is placed between the trainee and the visual display and the trainee can only see a limited amount of the visual display through the door's window. The limited view of the scene afforded the trainee will force the trainee to move around at various angles to see more of the scene and will also provide a frame of reference for making spatiotemporal judgments regarding the relationships between the trainee, the trainee's aircraft, and objects external to the aircraft.

20 Claims, 5 Drawing Sheets

(56) References Cited

U.S. PATENT DOCUMENTS

| | | | |
|---|---|---|---|
| 3,436,840 A * | 4/1969 | Noxon | 434/36 |
| 3,580,978 A * | 5/1971 | Ebeling | 434/43 |
| 3,678,601 A * | 7/1972 | McKnight | 434/38 |
| 4,154,416 A * | 5/1979 | Bruce et al. | 244/129.5 |
| 4,176,468 A * | 12/1979 | Marty, Jr. | 434/14 |
| 4,207,688 A * | 6/1980 | Derderian et al. | 434/43 |
| 4,373,169 A * | 2/1983 | Burkam | 348/123 |
| 5,015,188 A * | 5/1991 | Pellosie et al. | 434/38 |
| 5,137,348 A * | 8/1992 | Lacroix | 353/79 |
| 5,341,435 A * | 8/1994 | Corbett et al. | 382/103 |
| 5,380,204 A | 1/1995 | Decker | |
| 6,196,845 B1 * | 3/2001 | Streid | 434/44 |
| 6,231,003 B1 * | 5/2001 | Hibma et al. | 244/3.22 |
| 7,201,483 B2 | 4/2007 | Chung et al. | |
| 7,988,095 B2 * | 8/2011 | Roberts et al. | 244/135 A |
| 8,411,214 B2 * | 4/2013 | Chapman et al. | 349/13 |
| 2003/0215771 A1 | 11/2003 | Bartoldus et al. | |
| 2007/0264617 A1 | 11/2007 | Richardson et al. | |
| 2009/0253104 A1 | 10/2009 | Burggraf et al. | |
| 2013/0252208 A1 * | 9/2013 | Yudintsev et al. | 434/43 |
| 2014/0030692 A1 * | 1/2014 | Smith | 434/365 |

OTHER PUBLICATIONS

M. Meador, "Indoor air support—Virtual reality brings close air support training inside", U.S. Army Training and Doctrine Command, Office of the Chief of Public Affairs, online: <http://www.tradoc.army.mil/pao/tnsarchives/june%2006/060806-1.htm>, Jun. 2006, accessed Nov. 2008.

ASD-Network, "Boeing Trains C-17 Loadmasters", Aerospace & Defence Network, online: <http://www.asdnews.com/news-16428/Boeing_C-17_Loadmasters.htm>, 2008, accessed Nov. 2008.

Bohemia Interactive Community, "Loadmaster Virtual Reality Simulation", online: <http://community.bistudio.com/wiki/Loadmaster_Virtual_Reality_Simulation>, 2006, accessed Nov. 2008.

TheFreeLibrary, "Simulator helps aircraft recognize missile threats", National Defence Industrial Association, online: <http://www.thefreelibrary.com/Simulator+helps+aircraft+recognize+missile+threats.-a0128600670>, 2005, accessed Nov. 2008.

Bohemia Interactive Studio, bohemia Interactive to develop a Virtual Battlespace (VBS) Loadmaster Virtual Reality Simulator (LVRS) for the Australian Defence Force, Press Release, Apr. 2006, online: <http://www.virtualbattlespace.com/press_adf_lvrs.htm>, accessed Nov. 2008.

* cited by examiner

OBSERVER TRAINER SYSTEM

TECHNICAL FIELD

This application is a continuation-in-part of U.S. patent application Ser. No. 12/292,729 filed on Nov. 25, 2008.

The present invention relates to aircraft simulators for use in training aircraft personnel. More specifically, the present invention relates to systems and methods for use in training non-pilot aircrew such as cargo personnel, loadmasters, observers and search and rescue personnel in identifying threats to the aircraft and search and rescue situations.

BACKGROUND OF THE INVENTION

The explosion in computing power within the last 15 years has led to the widespread adoption of computer based simulations for training personnel in various tasks. Simulators can now be found for everything from piloting aircraft to driving cars. However, it has been in the military that simulation based training has found its most widespread use. Military based simulations now train military personnel for duties as diverse as driving a tank, being a door gunner on a helicopter gunship, to flying the latest military aircraft.

While military simulators for various crew positions in aircraft exist, there has been a dearth of simulators for crewmembers who work in the cargo compartment, for example, loadmasters, observers and search and rescue (SAR) technicians. Those that do exist do not provide an authentic "out of the window" experience that simulates the limited view that loadmasters, observers and SAR technicians have out of an aircraft window. Such simulators would be useful for training observers in spotting and identifying threats to the aircraft. As well, SAR technicians can be trained in spotting and reporting visual cues that would indicate a crash site or a rescue situation.

Present simulators for this purpose only allow for airborne and air sourced threats (such as missiles). None of the simulators presently available show ground based components of the threats such as personnel with shoulder launched missiles or anti-aircraft artillery pieces. As well, none of the present simulators have the capability to show ground based scenes that would be useful for training SAR technicians.

More importantly, none of the present simulators limit the vision of the trainees of the view out of the window. As is well-known, windows in aircraft, especially military aircraft, tend to be small and are not ideal for sight-seeing or for observing the region surrounding the aircraft. However, it is specifically through these windows that observers have to watch for threats to the aircraft and, when necessary, alert the flight aircrew to the existence and location of these threats. As such, a more authentic and realistic experience would be had from simulators if these simulators provided the trainees with a more limited view of the area around the aircraft. Trainees would then have to move their heads and bodies around to obtain a better view of the area, as they would have to do in real life. Furthermore, the viewing limitation imposed by the trainee's own aircraft also provide a frame of reference that affect the trainee's judgments about the spatiotemporal relationship amongst the trainee, the aircraft, and the objects external to the aircraft.

Some of the current simulators for training observers only provide trainees with a circular view of a scene outside the aircraft. Trainees only see this circular view and, as such, are not required to try and improve their view of the scene as would happen in real life.

Based on the above, there is therefore a need for newer and better simulator systems for training observers and SAR technicians in identifying both ground and air based circumstances which may need attention from the aircrew.

SUMMARY OF INVENTION

The present invention provides systems and methods for use in training crewmembers in the cargo compartment, such as loadmasters, observers and search and rescue personnel in detecting and identifying visual cues related to potential threats to aircraft and to ground based search and rescue circumstances. A visual display displays a scene generated by a visual scene generator apparatus. A vision limiting device, such as an actual door from an aircraft, equipped with a window is placed between the trainee and the visual display and the trainee can only see a limited amount of the visual display through the door's window. The limited view of the scene afforded the trainee will force the trainee to move around at various angles to see more of the scene as he normally would in real life. It will also provide a frame of reference for making spatiotemporal judgments regarding the relationships between the trainee, the trainee's aircraft, and objects external to the aircraft.

In a first aspect, the present invention provides a system for use in training observer personnel in aircraft, the system being for use with visual scene generator apparatus, the system comprising:

a visual display for displaying a scene generated by said visual scene generator apparatus, said scene generator apparatus comprising infrared projectors such that said scene being generated stimulates night vision equipment used by said observer personnel during training;

a reconfigurable vision limiting device for use by said observer personnel, said vision limiting device having an aperture and said vision limiting device being placed between said observer personnel and said visual display such that said observer personnel's only view of said scene is through said aperture of said vision limiting device, said vision limiting device being constructed and arranged such that said vision limiting device prevents said personnel from seeing a complete view of said scene except for what said personnel can see through said aperture of said device such that said personnel must move his or her head or body for a more complete view of said scene;

wherein said reconfigurable vision limiting device is an aircraft door with a window, said aircraft door being a door for a specific aircraft being simulated, and said system is for training observer personnel in assessing spatiotemporal relationships between artefacts viewed out of said window and parts of said aircraft being simulated;

said vision limiting device is removable and replaceable with aircraft doors of other aircraft to thereby simulate said other aircraft; and     wherein said observer personnel comprises non-pilot personnel including search and rescue technicians and personnel having cargo-related duties.

In a second aspect, the present invention provides a method for training observer personnel in aircraft, the method comprising:

a) providing a visual display for displaying a scene generated by a visual scene generator apparatus, said visual scene generator comprising infrared projectors such that said scene being generated stimulates night vision equipment used by said observer personnel during training;

b) providing a vision limiting device for use by said observer personnel, said vision limiting device being placed between said personnel and said visual display, said personnel's only view of said scene being through said vision limiting device, said vision limiting device being constructed and arranged such that said vision limiting device prevents said personnel from seeing a complete view of said scene except for what said personnel can see through said device such that said personnel must move his or her head or body for a more complete view of said scene;

c) displaying a scene on said visual display, said scene being a dynamic scene depicting a view outside of an aircraft in flight, said scene including a ground view as seen from said aircraft;

wherein said reconfigurable vision limiting device is an aircraft door with a window, said aircraft door being a door for a specific aircraft being simulated, and said method is for training observer personnel in assessing spatiotemporal relationships between artefacts viewed out of said window and parts of said aircraft being simulated;

said vision limiting device is removable and replaceable with aircraft doors of other aircraft to thereby simulate said other aircraft; and wherein said observer personnel comprises non-pilot personnel having cargo-related duties and search and rescue technicians.

BRIEF DESCRIPTION OF THE DRAWINGS

The invention will be described with reference to the accompanying drawings, wherein.

DETAILED DESCRIPTION OF THE INVENTION

Figure 1:
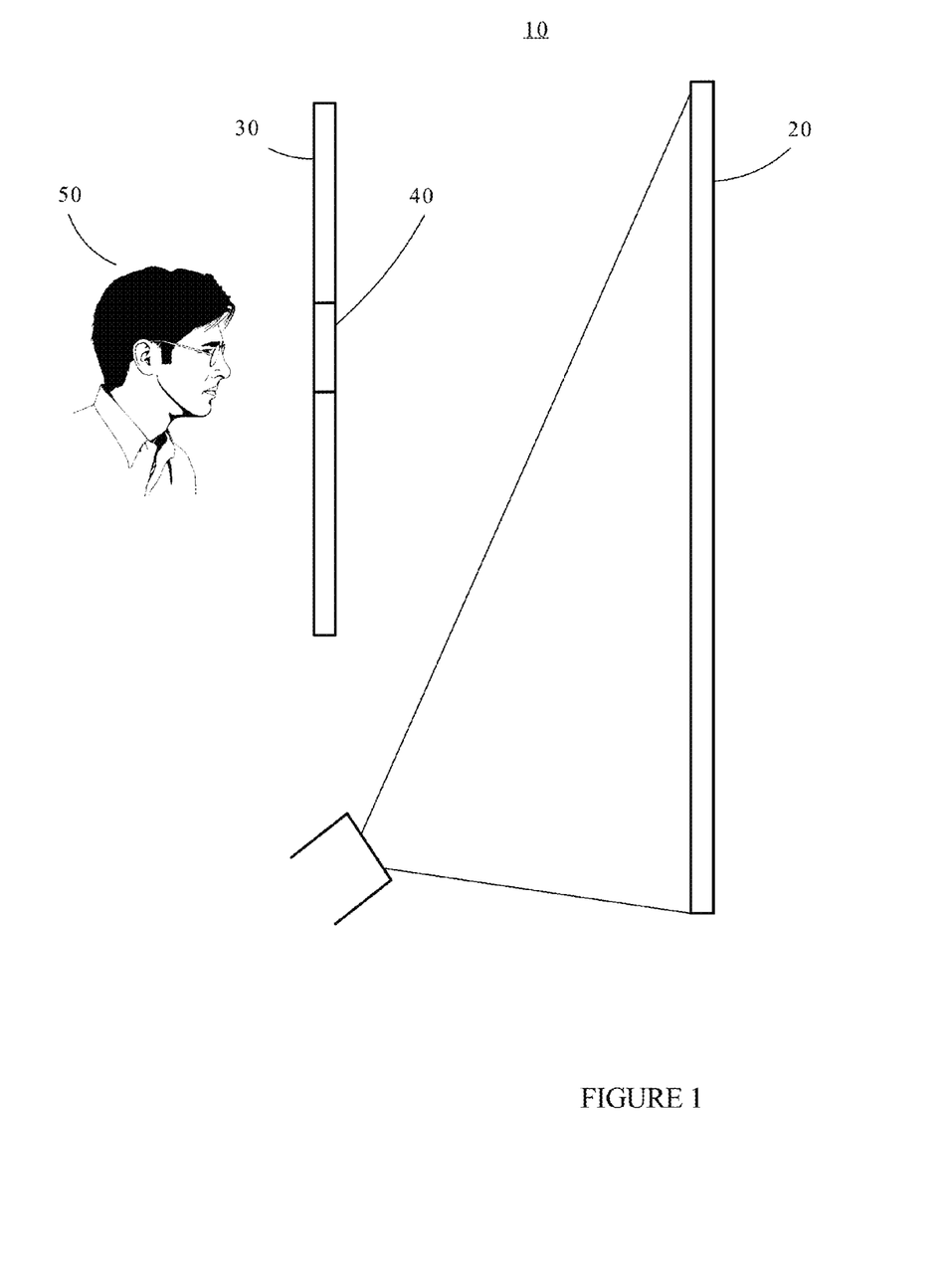
FIG. 1 is a schematic side view of one embodiment of the invention.

Referring to FIG. 1, a side view diagram of a training simulator for use with training crewmembers such as loadmasters, observers and SAR technicians is illustrated. The system 10 comprises a video display unit 20, a vision limiting device 30 with a window or aperture 40. The user/personnel 50 to be trained observes a scene being shown on the video unit 20 through the window or aperture 40. The vision limiting device 30 is positioned between the personnel 50 and the video display 20 and is apart from the display 20. The vision limiting device 30 prevents the personnel 50 from seeing the complete scene being presented on the display 20 except for what the personnel 50 can see through the window 40. This will, therefore, force the personnel 50 to, if he wants to see the whole scene, extend his neck, move his head (and possibly his body) around to obtain a better view of the scene. The personnel 50 may be, depending on the circumstances inside the aircraft for which he is training for, standing or sitting while observing the scene through the window 40.

The video display 20 may be a flat or curved screen video display, a projector and screen assembly, a cathode ray tube (CRT) device, a liquid crystal display (LCD) screen, a plasma screen, or any other device suitable for displaying video displays from such signals as a TV signal, a computer video output, or any similar signals. In one embodiment, the video display 20 comprises a projector capable of projecting infrared (IR) based scenes on to a screen such that the scenes stimulate night vision equipment used by personnel being trained. The night vision equipment may take the form of night vision goggles regularly used by armed forces personnel in night-time or low-light operations. The advantage of such an IR capable projector is that personnel can train while using the actual equipment used in the field.

The vision limiting 30 may be any device which prevents the personnel 50 from seeing the whole scene on the display 20 except for what the personnel 50 can see through the window 40. As such, the device 30 may be an inflatable screen with a plastic window an actual door of an aircraft being simulated, or a replica or reasonable facsimile of an aircraft door or airframe with a window. Of course, it would be preferable, for training and simulation purposes, for the device 30 to have a window similar in size and nature to an aircraft window. As well, it would be preferable if the personnel 50 would not be able to see the edges of the display 20 through the window as this may ruin the illusion of being inside an aircraft and looking out through one of the aircraft's windows. The device 30 may therefore be a shield or shroud which covers the periphery of the display 20, thereby limiting the view seen by the personnel 50 to only what is inside the shroud or shield (namely the screen of the display 20).

In one implementation, the vision limiting device 30 is an actual door from an aircraft being simulated. For this implementation, the vision limiting device is removable and reconfigurable so that different aircraft can be simulated by the system. As an example, a side door, equipped with a window, is taken from a cargo aircraft to be simulated and is used as the vision limiting device. As another example, a rotary aircraft's side door with a window can also be used as the vision limiting device. A C-130 Hercules side door can be used to provide training for C-130 loadmasters or rear cargo personnel. A UH-1 Huey side door or a UH-60 Blackhawk side door can be used for training personnel to be deployed in helicopters.

By having the vision limiting device be removable and replaceable, personnel can be trained on different types and models of aircraft by simply replacing the vision limiting device with the appropriate door for the aircraft being simulated. As is known, different aircraft models, even if they have a similar make, can have differences in the configuration of their doors and windows. These differences can be significant across different aircraft types and even across different models of the same aircraft. As such, to provide personnel who have cargo-related duties with training in the detection, assessment, and reporting of threats (both airborne and ground based) and potential dangers to the aircraft, the system is reconfigurable. Thus, instead of having different simulators for different aircraft types and different aircraft models, the system can simulate real-world conditions for most aircraft models. Along with changing the parameters of the software of the scene generation system, the vision limiting device 30 merely needs to be replaced with a suitable door from the aircraft to be simulated to provide training personnel with the proper training environment. As can be imagined, the parameters for the scene generation system, especially the parameters that control the different flight characteristics of the new aircraft to be simulated (e.g. altitude, speed, roll rates, roll limits, pitch rates, pitch limits) would need to be adjusted to simulate a different aircraft.

To provide the scene (preferably a dynamic scene) portrayed on the display 20, a controller 60 is coupled to the display 20. The controller 60 may be a computer with suitable software for simulating scenes outside of an aircraft in flight. Preferably, the software is based on a suitable flight simulator so as to provide proper air and ground visual artefacts in the scene presented to the personnel 50. Furthermore, in a preferred embodiment, the visual scene presented to the personnel 50 is a scene that a cargo compartment crew would see by looking out of an actual aircraft. The controller 60 has a visual scene generator 65 which actually generates the scenes viewed by the personnel 50. Preferably, the visual scene generator 65 is able to generate high resolution day and night scenes with different kinds of meteorological conditions. As well, it is preferred that the scenes be such that they are viewable using the naked eye or with night vision equipment. For such an implementation, the scenes would need to be projected on to the visual display using light in the visible and/or near infrared wavelengths such that the projected scenes are capable of stimulating night vision goggles.

The controller, operated by suitably trained personnel, should be capable of providing dynamic scenes such as those encountered by actual aircraft when flying missions. As an example, the controller should be capable of showing contrails (or vapor trails) from missiles, other aircraft (both fixed wing and helicopters), and other possible airborne threats. Similarly, ground based threats, such as anti-aircraft batteries, missile batteries, artillery, military formations, tracer fire from ground based threats, and ground vehicles should, preferably, also be viewable in the dynamic display. These and other ground and air visual artefacts can be used to train personnel 50 in not only identifying threats but also potential threats to the aircraft. Furthermore, these artefacts can be used to train personnel in judging their spatiotemporal relationship with the personnel's aircraft. As an example, these artefacts can be used to train the personnel in assessing distances, time to impact, altitude, direction, etc. of these artefacts relative to the personnel's simulated aircraft. As a further example, if the personnel sees an incoming simulated missile, the personnel can be trained to assess if the missile will make impact with aircraft and, if so, how much time before the impact and potentially where the impact will occur.

It must be noted that these visual artefacts or visual cues may include parts of the aircraft being simulated. As an example, a trainee viewing a scene outside the simulated aircraft may have his view obstructed by the simulated aircraft's wing or engine. In a real-life situation, the placement of the window on the aircraft door may be such that the crewman's view of the outside is mostly obstructed by the aircraft's wing or engine. The simulation should therefore also simulate this obstruction such that the trainee will need to assess an incoming threat in light of his obstructed view.

Regarding the controller, the controller should also be capable of displaying non-military visual cues useful for training SAR technicians. As such, the controller should be capable of showing crash sites, forest fires, and other natural disasters. Furthermore, the controller should be capable of showing these artefacts and visual cues (both military and non-military) as they are seen from an aircraft flying at various altitudes. With such a system and such a controller, SAR technicians can be trained to spot telltale signs of crash sites, burning wreckage, sinking ships, smoke signals, and other search and rescue situations. Similarly, military personnel can be trained to recognize and spot telltale signs of incoming threats or potential threats to the aircraft using this system and controller. As explained above, SAR technicians can also be trained, using the system, to assess spatiotemporal relationships between artefacts they see and the simulated aircraft. SAR technicians can therefore be trained to, as an example, assess how far a simulated crash site is from the aircraft or roughly how long it will take the aircraft will take to reach such a simulated crash site.

Figure 2:
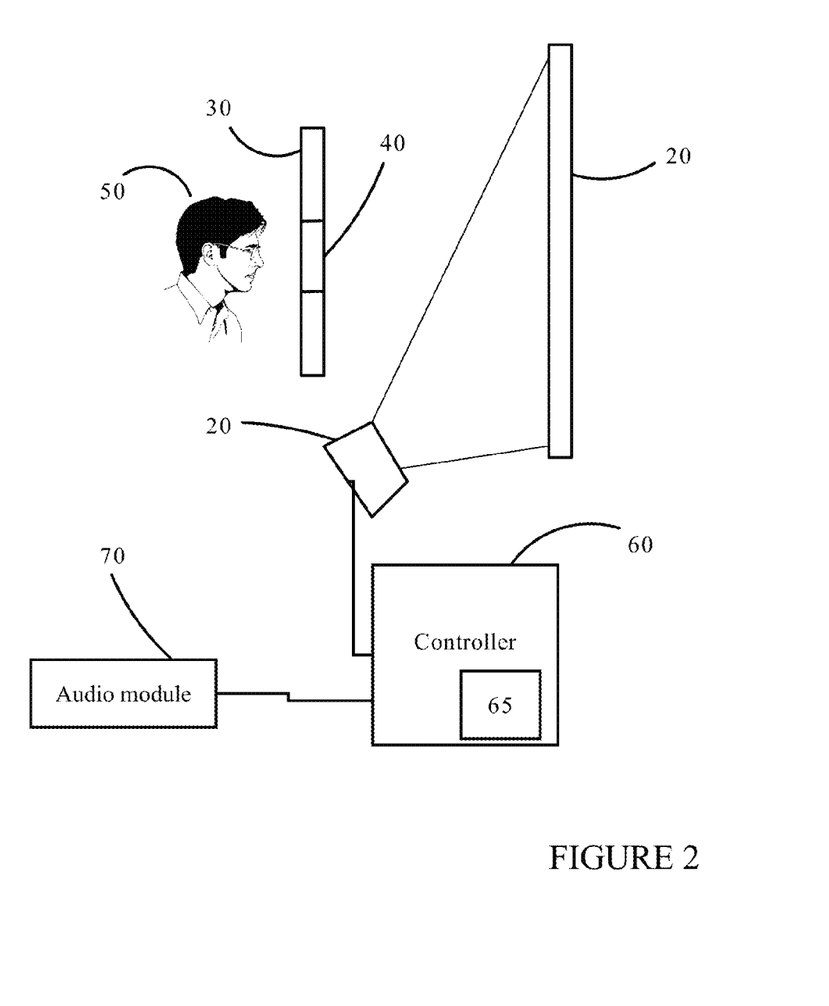
FIG. 2 is a schematic view of one variant of the invention which uses an audio module.

For further authenticity to the simulation being provided to the personnel 50 being trained, an audio module may also be coupled to the controller 60 (see FIG. 2). The audio module 70 would provide the personnel 50 being trained with audio input from other observers in the simulated aircraft or from the flight aircrew. Similarly, the personnel 50 being trained may also provide audio feedback to the other observers or the flight aircrew regarding what he sees through the window. The audio provided to the personnel 50 may be recorded audio samples of real-life chatter from actual aircraft or be pre-recorded simulated responses. Either way, the audio may come from the controller 60. Thus, if a simulated incoming missile threat is observed by the personnel 50, he can indicate the presence of the threat by communicating with a simulated flight aircrew via the audio module. The controller, upon receiving this input from the personnel, can then adjust the aircraft simulation to mimic the view out of an aircraft that is taking evasive manoeuvres. The view seen by the personnel thus changes accordingly and the personnel can then visually track the incoming virtual missile threat and provide guidance as to whether the measures taken by the virtual flight aircrew have been successful or not.

Similar to the above, as an example, an SAR technician can spot a potential crash site and indicate this to the virtual flight aircrew through the audio module. The controller can then adjust the simulation to mimic an aircraft manoeuvring for a closer look at the potential crash site. The view seen by the personnel thus similarly changes as the aircraft may lose some altitude and may adjust its heading accordingly. The SAR technician being trained can thus visually verify if what he saw was a virtual crash site or not. As an alternative to the above, the SAR technician can use the audio system to direct the human or computer controlling the simulated aircraft towards the object of interest for purposes such as a visual inspection, over-flight, or a simulated equipment drop.

It should be noted that while pre-recorded audio may be used to provide authenticity to the training experience for personnel 50 as detailed above, a more authentic training experience can be had by providing live audio to the personnel 50. This can be done by networking the system 10 with other training modules 80A, 80B, and 80C being used by other personnel (see FIG. 3). By doing this, other training personnel can have different views of the same event (assuming all the personnel are supposed to be on the same aircraft) and they can be trained to track threats and other visual cues as a team. Thus the system 10 allows training of an entire aircrew and allows interaction with other training personnel on the simulation network.

Figure 3:
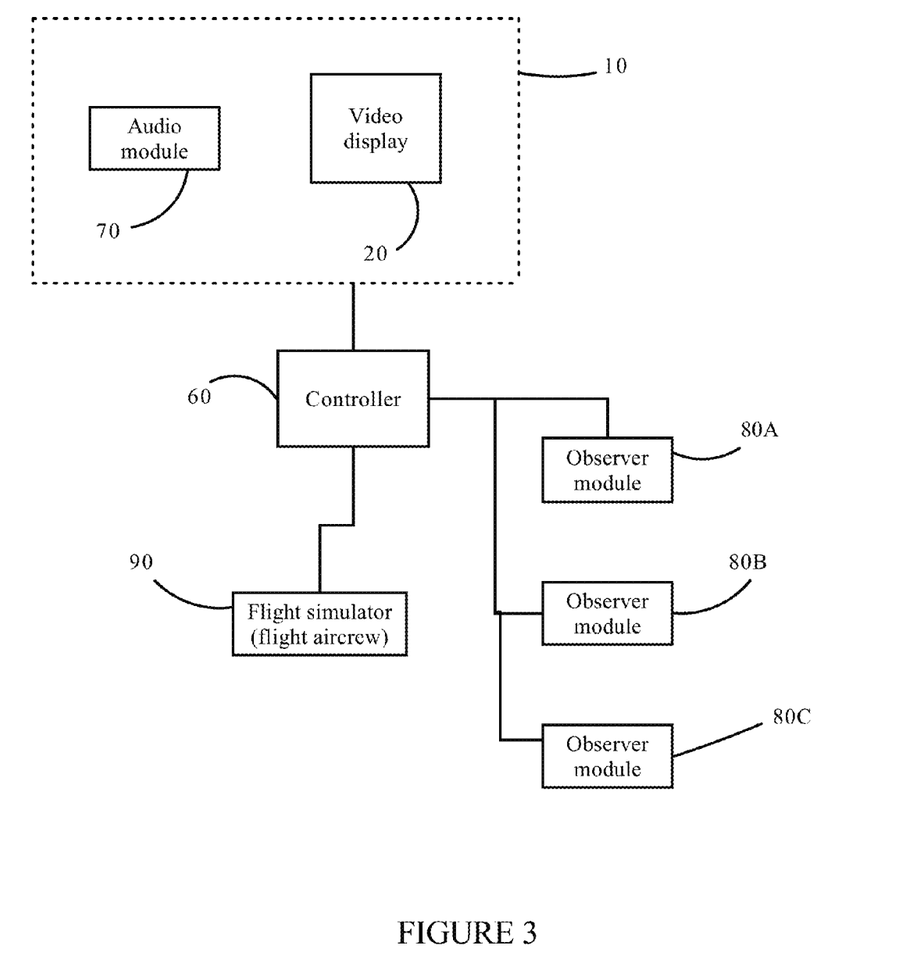
FIG. 3 is a block diagram of another variant of the invention in which multiple instances of the invention are networked together for team training.

As noted above, it is preferable that the controller be used in conjunction with a flight simulator to provide realistic views of the area around the aircraft. For adding yet more authenticity, a flight simulator module 90, controlled by a real flight aircrew (either in training or not) can be used with the networked configuration as shown in FIG. 3. This configuration allows both flight deck crew and rear cargo crew to train together as one unit. The configuration can be configured so that flight control adjustments by the flight aircrew are reflected by the views seen by the personnel. Thus, if the flight aircrew banks the simulated aircraft to the left, the personnel would see a corresponding change in the scene that they were viewing. Using this example, trainees who were looking outside the virtual right side of the aircraft and who were visually tracking a ground based target would see the target disappear underneath the virtual aircraft. Thus, to keep this target in view, these trainees, when using the system 10, would have to angle their heads accordingly as the virtual aircraft banks to the left.

The networking between the various personnel using the system may be carried further by also networking the audio between the various personnel. Thus, loadmasters, observer personnel and/or SAR technician can be in constant communication with each other and with the flight aircrew. Based on the feedback from the observers, the flight aircrew can adjust the flight of the virtual aircraft to avoid virtual threats, obtain a better view of a potential search and rescue situation, or otherwise react to the input from the observers. As noted above, any adjustments to the flight by the aircrew (and/or the operator of the controller) is reflected in the views seen by the personnel.

In one implementation of the invention, the visual display was a 2 meter fabric dome immersive display from Immersive Display Solutions of Atlanta Ga. Other immersive displays and, in fact, other types of displays may also be used. For this implementation, the dome may be inflatable or rigid (such as the immersive display marketed by Immersive Display UK located in Essex, UK). In some implementations, the vision limiting device is a canopy deployed over the immersive display. As noted above, the canopy has a window that has similar size and shape to the windows of the aircraft being simulated.

For the visual scene generator (referred to above as the controller but may be considered as part of a larger controller), the implementation used a number of dual core processors (with sufficient support circuitry) running in parallel.

For the projectors used in one implementation, a Christie Matrix StIM™ projector system was used. The projector ideally processes and displays infrared content such that both visible and infrared spectrum content can be simultaneously displayed. This capability would allow trainees to use their night vision goggles in training as the IR spectrum content can suitably stimulate the night vision goggles.

For the above noted implementation, various types of software may be used to generate the scenes viewed by the training personnel. In this implementation, the software product marketed under the name Vega Prime by Presagis (based out of Montreal, Quebec, Canada) with the Vega Prime FX and Vega Prime Marine was used as the image generator software rendering tool. In another implementation, Genesis IG from Diamond Visionics was used as the image generator software rendering tool.

Other software may also be used to generate the scenes. Software developed by Bohemia Interactive (such the package marketed as Virtual Battlespace and Virtual Battlespace 2) may be modified to provide the various scenes used by the above noted system. Military grade aircraft simulation software may also be adjusted to provide the various scenes shown to the personnel by the visual display.

Figure 4:
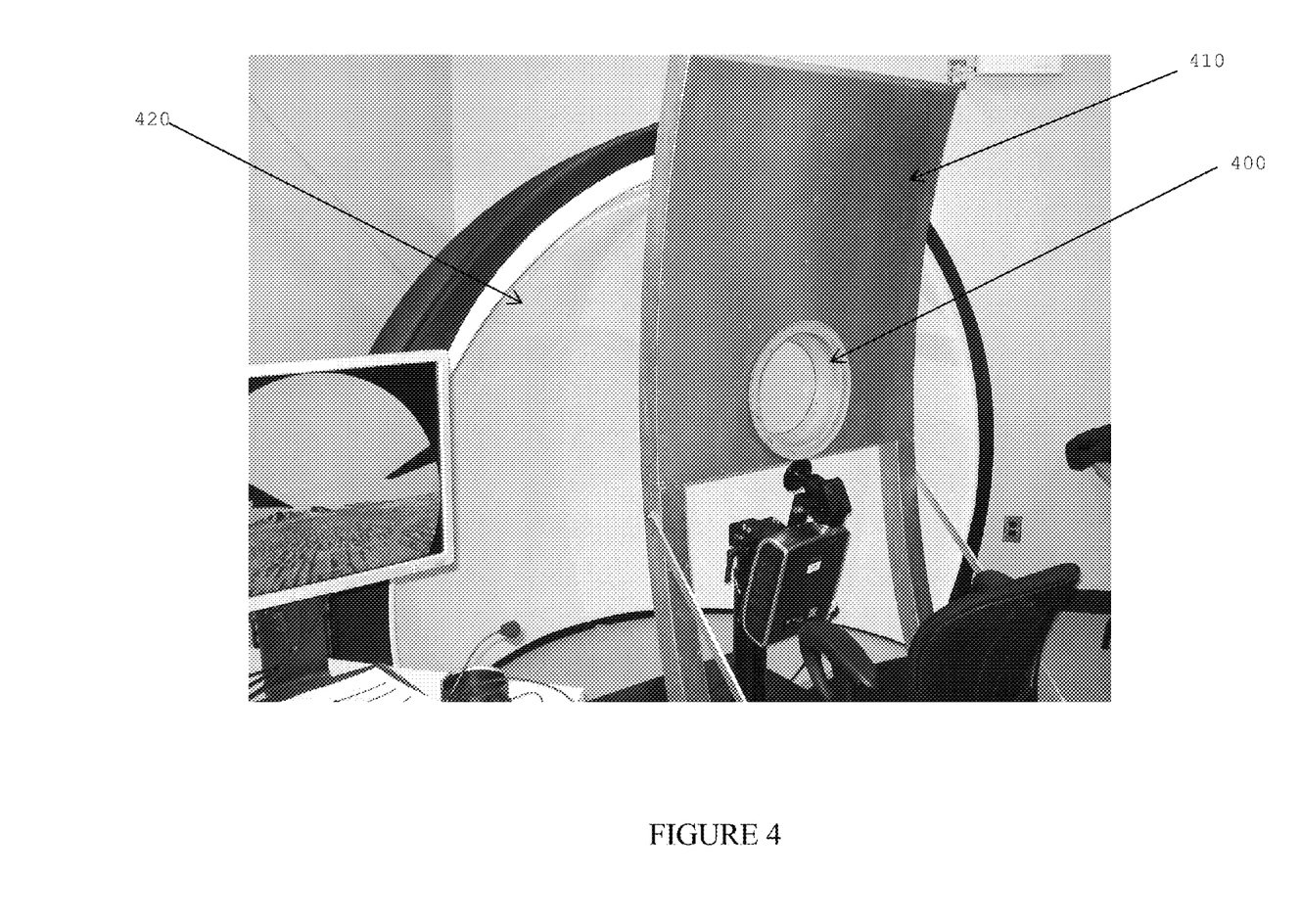
FIG. 4 is a diagram illustrating one implementation of one aspect of the invention.

Referring to FIG. 4, an image of the above noted implementation of the invention, specifically designed to simulate a C-130 Hercules aircraft, is shown. As can be seen from the image, a circular window 400 is provided on a vision limiting device 410 designed to simulate a door or an airframe of a C-130 Hercules aircraft. The display 420 is a dome immersive display as described above. A monitor to the left of the image in FIG. 4 shows an image of what would be projected on to the dome and which would be seen by the personnel seated in front of the window 400.

It should be noted that while the above noted implementation of the invention was specifically tasked to train personnel for the observer position in C-130 aircraft, other aircraft which have observers and/or which have the capability to have observers or SAR technicians or other cargo crewmembers as aircrew may be simulated as well.

Figure 5:
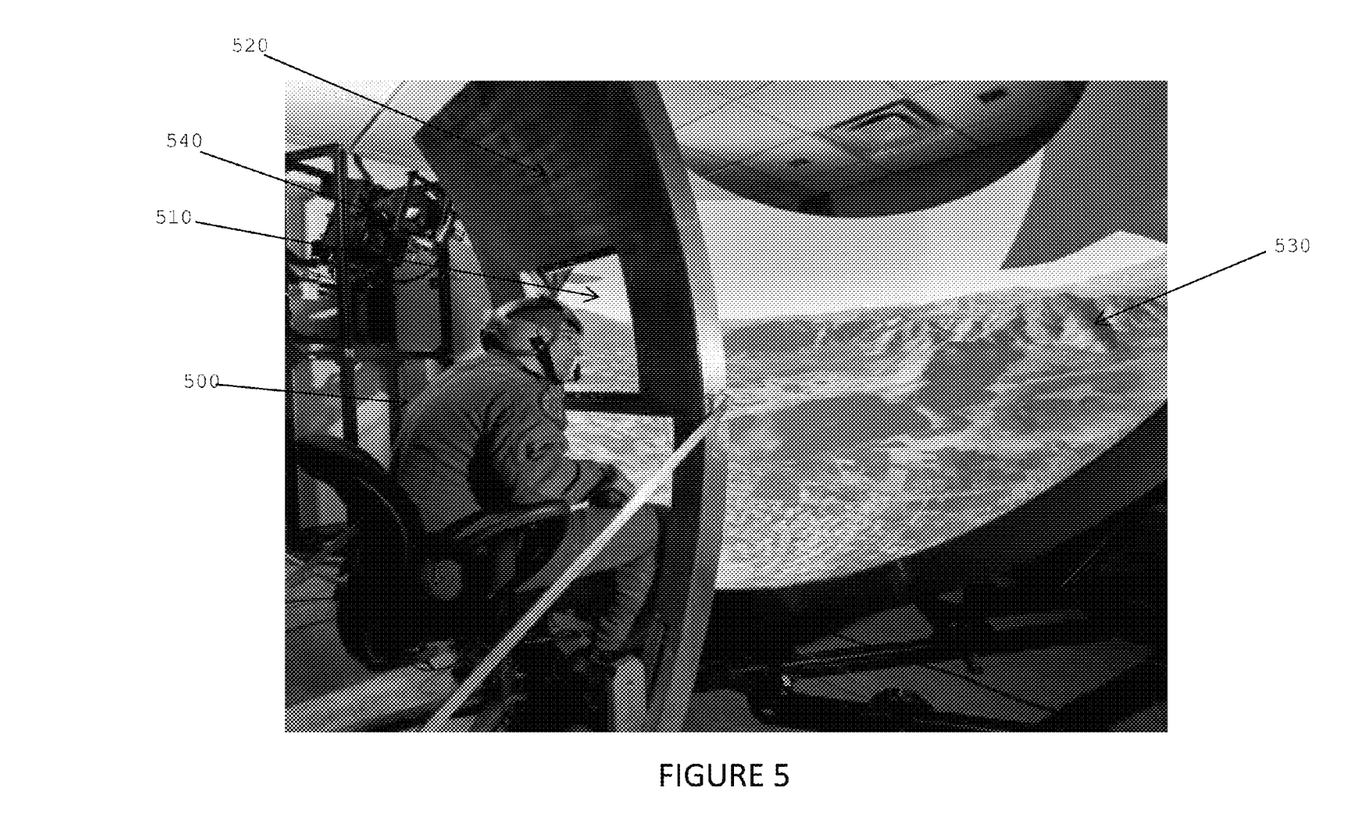
FIG. 5 is a diagram illustrating another implementation of one aspect of the invention.

Referring to FIG. 5, an image of another implementation of the present invention is illustrated. A trainee 500 sits in front of a window 510 that is part of a door 520 placed between the trainee 500 and a display 530 that shows a simulated scene. The simulated scene is projected on the display by IR-capable projectors 540. The door 520 acts as the vision limiting device and is reconfigurable, removable, and replaceable with doors from other aircraft to be simulated. The trainee views the generated scene through the window and the trainee's view is as it would be in the aircraft being simulated. It should be noted that the window in FIG. 5 is square while the window in FIG. 4 is round and that the window in FIG. 4 is smaller than the window in FIG. 5. This highlights one of the advantages of the present invention—different aircraft will have differently configured windows and, as such, non-pilot personnel will need to adapt to the different configurations of viewing portals in different aircraft. By providing the ability to use actual aircraft doors in the system (through the reconfigurable and replaceable vision limiting device), trainees will be exposed to the shortcomings and/or advantages of the windows of the different aircraft being simulated.

A person understanding this invention may now conceive of alternative structures and embodiments or variations of the above all of which are intended to fall within the scope of the invention as defined in the claims that follow.

Having thus described the invention, what is claimed as new and secured by Letters Patent is:

1. A system for use in training observer personnel in aircraft, the system being for use with visual scene generator apparatus, the system comprising:

a visual display for displaying a scene generated by said visual scene generator apparatus, said scene generator apparatus comprising infrared projectors such that said scene being generated stimulates night vision equipment used by said observer personnel during training;

a reconfigurable vision limiting device for use by said observer personnel, said vision limiting device having an aperture and said vision limiting device being placed between said observer personnel and said visual display such that said observer personnel's only view of said scene is through said aperture of said vision limiting device, said vision limiting device being constructed and arranged such that said vision limiting device prevents said personnel from seeing a complete view of said scene except for what said personnel can see through said aperture of said device such that said personnel must move his or her head or body for a more complete view of said scene;

wherein said reconfigurable vision limiting device is an aircraft door with a window, said aircraft door being a door for a specific aircraft being simulated, and said system is for training observer personnel in assessing spatiotemporal relationships between artefacts viewed out of said window and parts of said aircraft being simulated;

said vision limiting device is removable and replaceable with aircraft doors of other aircraft to thereby simulate said other aircraft; and wherein said observer personnel comprises non-pilot personnel including search and rescue technicians and personnel having cargo-related duties.

2. A system according to claim 1 wherein said scene is a dynamic scene depicting a view outside of an aircraft in flight.

3. A system according to claim 2 wherein said scene includes a ground view as seen from said aircraft.

4. A system according to claim 2 wherein said scene includes a depiction of at least one airborne threat to said aircraft such that said observer personnel can assess an imminence of said at least one airborne threat.

5. A system according to claim 3 wherein said scene includes a ground view depicting a scene useful for identifying potentially dangerous circumstances encountered in search and rescue operations.

6. A system according to claim 3 wherein said scene includes a ground view depicting at least one ground sourced threat to said aircraft.

7. A system according to claim 1 further including at least one audio module for use with a central controller, said at least one audio module being for communications between said observer personnel and other aircrew being trained.

8. A system according to claim 1 further including at least one audio module for use with a central controller, said at least one audio module being for providing said observer personnel with recorded audio.

9. A system according to claim 1 wherein said scene generated by said visual scene generator apparatus changes in response to commands provided by training flight aircrew to a flight simulator.

10. A system according to claim 1 wherein said system further includes at least one audio module for use with a central controller, said at least one audio module being for communications between said observer personnel and said training flight aircrew.

11. A system according to claim 1 wherein said visual display comprises a projector and a projector screen.

12. A system according to claim 1 wherein said specific aircraft is a cargo aircraft.

13. A system according to claim 1 wherein said specific aircraft is a rotary-wing aircraft.

14. A method for training observer personnel in aircraft, the method comprising:
   a) providing a visual display for displaying a scene generated by a visual scene generator apparatus, said visual scene generator comprising infrared projectors such that said scene being generated stimulates night vision equipment used by said observer personnel during training;
   b) providing a vision limiting device for use by said observer personnel, said vision limiting device being placed between said personnel and said visual display, said personnel's only view of said scene being through said vision limiting device, said vision limiting device being constructed and arranged such that said vision limiting device prevents said personnel from seeing a complete view of said scene except for what said personnel can see through said device such that said personnel must move his or her head or body for a more complete view of said scene;
   c) displaying a scene on said visual display, said scene being a dynamic scene depicting a view outside of an aircraft in flight, said scene including a ground view as seen from said aircraft;

wherein said reconfigurable vision limiting device is an aircraft door with a window, said aircraft door being a door for a specific aircraft being simulated, and said method is for training observer personnel in assessing spatiotemporal relationships between artefacts viewed out of said window and parts of said aircraft being simulated;

said vision limiting device is removable and replaceable with aircraft doors of other aircraft to thereby simulate said other aircraft; and wherein said observer personnel comprises non-pilot personnel having cargo-related duties and search and rescue technicians.

15. A method according to claim 14 wherein said scene includes a depiction of at least one airborne threat to said aircraft.

16. A method according to claim 14 wherein said scene includes a depiction of at least one ground sourced threat to said aircraft.

17. A method according to claim 14 wherein said scene includes a depiction of ground circumstances useful for training search and rescue personnel.

18. A method according to claim 14 further including the step of providing audio communications to said observer personnel, said audio communications being with other aircrew being trained.

19. A method according to claim 14 further including the step of providing audio communications to said observer personnel, said audio communications being with flight personnel piloting said aircraft being simulated.

20. A method according to claim 14 further including the step of adjusting said scene in response to commands provided by said flight personnel.

* * * * *